United States Patent
Jou et al.

(10) Patent No.: US 12,018,981 B2
(45) Date of Patent: Jun. 25, 2024

(54) POLARIZATION INDEPENDENT OPTOELECTRONIC DEVICE AND METHOD

(71) Applicant: TAIWAN SEMICONDUCTOR MANUFACTURING COMPANY LIMITED, Hsin-Chu (TW)

(72) Inventors: Chewn-Pu Jou, Hsinchu (TW); Feng Wei Kuo, Zhudong Township (TW); Huan-Neng Chen, Taichung (TW); Lan-Chou Cho, Hsinchu (TW)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 18/202,703

(22) Filed: May 26, 2023

(65) Prior Publication Data
US 2023/0296430 A1    Sep. 21, 2023

Related U.S. Application Data

(63) Continuation of application No. 17/175,961, filed on Feb. 15, 2021, now Pat. No. 11,703,379, which is a continuation of application No. 16/207,670, filed on Dec. 3, 2018, now Pat. No. 10,921,182.

(60) Provisional application No. 62/753,142, filed on Oct. 31, 2018.

(51) Int. Cl.
*G01J 1/04* (2006.01)
*G01J 1/42* (2006.01)
(Continued)

(52) U.S. Cl.
CPC .......... *G01J 1/0422* (2013.01); *G01J 1/0474* (2013.01); *G01J 1/4228* (2013.01); *G01J 1/44* (2013.01); *G02B 6/4206* (2013.01)

(58) Field of Classification Search
CPC ...... G01J 1/0422; G01J 1/0474; G01J 1/4228; G01J 1/44; G01J 1/4257; G02B 6/4206;
(Continued)

(56) References Cited

U.S. PATENT DOCUMENTS

| 7,065,272 B2 | 6/2006 | Taillaert et al. |
| 7,194,166 B1 | 3/2007 | Gunn et al. |

(Continued)

FOREIGN PATENT DOCUMENTS

| CN | 101142500 A | 3/2008 |
| GB | 1479298 A | 7/1977 |

(Continued)

OTHER PUBLICATIONS

Lucas B. Soldano, et al., "Optical Multi-Mode Interference Devices based on Self-Imaging: Principles and Applications", Journal of Lightwave Technology, Apr. 1995, pp. 615-627, vol. 13, No. 4.

*Primary Examiner* — Tony Ko
(74) *Attorney, Agent, or Firm* — Cooper Legal Group, LLC (57) ABSTRACT

A device includes a scattering structure and a collection structure. The scattering structure is arranged to concurrently scatter incident electromagnetic radiation along a first scattering axis and along a second scattering axis. The first scattering axis and the second scattering axis are non-orthogonal. The collection structure includes a first input port aligned with the first scattering axis and a second input port aligned with the second scattering axis. A method includes scattering electromagnetic radiation along a first scattering axis to create first scattered electromagnetic radiation and along a second scattering axis to create second scattered electromagnetic radiation. The first scattering axis and the second scattering axis are non-orthogonal. The first scattered electromagnetic radiation is detected to yield first detected radiation and the second scattered electromagnetic radiation is detected to yield second detected radiation. The first detected radiation is phase aligned with the second detected radiation.

20 Claims, 6 Drawing Sheets

(51) Int. Cl.
*G01J 1/44* (2006.01)
*G02B 6/42* (2006.01)

(58) Field of Classification Search
CPC .. G02B 6/4204; G02B 6/2793; G02B 6/2808; G02B 6/2813; G02B 6/4214
See application file for complete search history.

(56) References Cited

U.S. PATENT DOCUMENTS

| | | |
|---|---|---|
| 7,734,122 B1 | 6/2010 | Mackie |
| 9,739,918 B2 | 8/2017 | Arbabi et al. |
| 2013/0123648 A1* | 5/2013 | Stampoulidis ......... A61N 5/062 600/478 |
| 2015/0255495 A1 | 9/2015 | Park |
| 2016/0091664 A1 | 3/2016 | Doany et al. |
| 2017/0294697 A1 | 10/2017 | Jou et al. |
| 2018/0113256 A1 | 4/2018 | Shaw |
| 2020/0058549 A1 | 2/2020 | Choi et al. |
| 2020/0279877 A1 | 9/2020 | Kim |

FOREIGN PATENT DOCUMENTS

| | | |
|---|---|---|
| TW | 202015098 A | 4/2020 |
| TW | 202141772 A | 11/2021 |

\* cited by examiner

1605 — Scatter electromagnetic radiation along a first scattering axis to create first scattered electromagnetic radiation and along a second non-orthogonal scattering axis to create second scattered electromagnetic radiation 1610 — Detect the first scattered electromagnetic radiation to yield first detected radiation and detect the second scattered electromagnetic radiation to yield second detected radiation 1615 — Detect the first scattered electromagnetic radiation to yield first detected radiation and detect the second scattered electromagnetic radiation to yield second detected radiation

FIG. 16

POLARIZATION INDEPENDENT OPTOELECTRONIC DEVICE AND METHOD

RELATED APPLICATIONS

This application is a continuation of and claims priority to U.S. Non-Provisional application Ser. No. 17/175,961, titled "POLARIZATION INDEPENDENT OPTOELECTRONIC DEVICE AND METHOD" and filed on Feb. 15, 2021, which is a continuation of and claims priority to U.S. Non-Provisional application Ser. No. 16/207,670, titled "POLARIZATION INDEPENDENT OPTOELECTRONIC DEVICE AND METHOD" and filed on Dec. 3, 2018, which claims priority to U.S. Provisional Application 62/753,142, titled "POLARIZATION INDEPENDENT OPTOELECTRONIC DEVICE AND METHOD" and filed Oct. 31, 2018. U.S. Non-Provisional application Ser. No. 17/175,961, U.S. Non-Provisional application Ser. No. 16/207,670, and U.S. Provisional Application 62/753,142 are incorporated herein by reference.

BACKGROUND

The rapid expansion in the use of the Internet has resulted in a demand for high speed communications links and devices, including optical links and devices. Optical links using fiber optics have many advantages compared to electrical links: large bandwidth, high noise immunity, reduced power dissipation, and minimal crosstalk. Optoelectronic integrated circuits made of silicon are useful since they can be fabricated in the same foundries used to make very-large scale integrated (VLSI) circuits. Optical communications technology is typically operating in the 1.3 µm and 1.55 µm infrared wavelength bands. The optical properties of silicon are well suited for the transmission of optical signals, due to the transparency of silicon in the infrared wavelength bands of 1.3 µm and 1.55 µm and the high refractive index of silicon.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Optoelectronic devices are employed to communicate optical signals, through a medium, such as a fiber optic cable, for example. On a receiving end of the medium, an optoelectronic receiver collects incident electromagnetic radiation and performs an optical-to-electrical conversion to allow processing of the information carried on the incident electromagnetic radiation. In some embodiments, an optoelectronic device comprises a scattering structure to scatter the incident electromagnetic radiation and a collection structure comprising input ports positioned proximate the scattering structure to collect the scattered electromagnetic radiation. The collected scattered electromagnetic radiation is provided to one or more photodetectors to perform an optical-to-electrical conversion. In some embodiments, the input ports are positioned at different radial positions around a periphery of the scattering structure, where the radial positions define oblique angles with respect to a center point of the scattering structure. In some embodiments, the scattering structure concurrently scatters incident electromagnetic radiation along non-orthogonal scattering axes, and the input ports are aligned in the collection structure with the non-orthogonal scattering axes. In some embodiments, the incident electromagnetic radiation exiting the medium is vertically polarized. However, the particular orientation of the orthogonal components of the vertically polarized electromagnetic radiation impinging on the collection structure is indeterminate. As will be described in detail below, the relative positioning of the input ports in the collection structure enhances polarization independence of the optoelectronic device.

Figure 1:
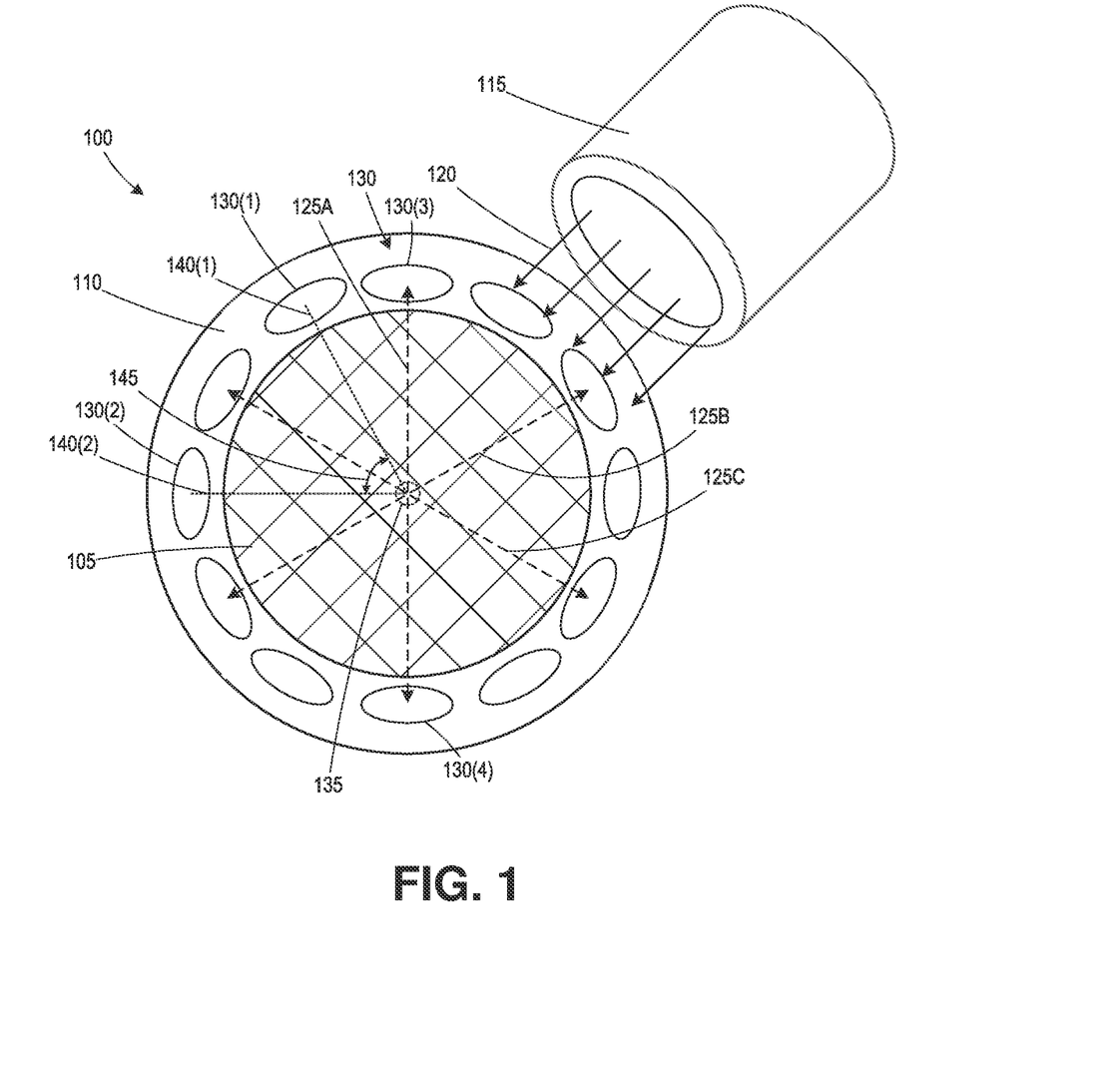
FIG. 1 illustrates a top view of an optoelectronic device in accordance with some embodiments.

Referring now to FIG. 1, a top view of a portion of an optoelectronic device 100 in accordance with some embodiments is illustrated. The optoelectronic device 100 comprises a scattering structure 105 and a collection structure 110. In some embodiments, a medium 115, such as a fiber optic cable, etc. terminates proximate the optoelectronic device 100. Electromagnetic radiation 120 exits the medium 115 and impinges on the scattering structure 105. Electromagnetic radiation reflected from the scattering structure 105 is received into the collection structure 110. In some embodiments, the medium 115 is positioned at an oblique angle with respect to a horizontal plane comprising the scattering structure 105. According to some embodiments, width and length dimensions of the scattering structure 105 are about twice the corresponding width and length dimensions of the medium 115. In some embodiments, the electromagnetic radiation 120 is vertically polarized. A "vertically polarized" electromagnetic wave comprises an electric field vector and a magnetic field vector at a right angle with respect to the electric field vector. Both the electric field vector and magnetic field vector are perpendicular to the direction of propagation. According to some embodiments, the scattering structure 105 scatters the electromagnetic radiation 120 along scattering axes 125A, 125B, 125C that are non-orthogonal with respect to one another. In some embodiments, the number and orientation of the scattering axes 125A, 125B, 125C varies. In accordance with some embodiments, certain scattering axes are orthogonal to one another, but non-orthogonal to other scattering axes, such that at least a first scattering axis 125A is non-orthogonal with respect to at least a second scattering axis 125B.

In some embodiments, the collection structure 110 comprises input ports 130, which are referred to individually as input ports 130(1) . . . 130(n). In some embodiments, the input ports 130 are positioned around a periphery of the scattering structure 105. In some embodiments, the input ports 130 collectively continuously cover an entire periphery of the scattering structure 105. In some embodiments, particular adjacent input ports 130 collectively cover continuous portions of a periphery of the scattering structure 105. In some embodiments, the input ports 130 cover portions of the periphery of the scattering structure 105 in a non-continuous manner. In some embodiments, the collection structure 110 comprises at least three input ports 130. In some embodiments, the collection structure 110 is divided into at least three sectors, each sector having at least one input port 130. According to some embodiments, the input ports 130 are silicon structures or wave guides that direct the incident electromagnetic radiation.

According to some embodiments, the input ports 130 are positioned at different radial positions around the scattering structure 105 with respect to a center point 135 of the scattering structure 105. For example, the input port 130(1) is at a first radial position 140(1), and the input port 130(2) is at a second radial position 140(2). The radial positons 140(1), 140(2) define an oblique angle 145 with respect to the center point 135 of the scattering structure 105.

According to some embodiments, certain input ports 130 are aligned with the scattering axes. For example, the input port 130(3) is aligned with one end of the scattering axis 125A, and the input port 130(4) is aligned with an opposite end of the scattering axis 125A.

Figure 2:
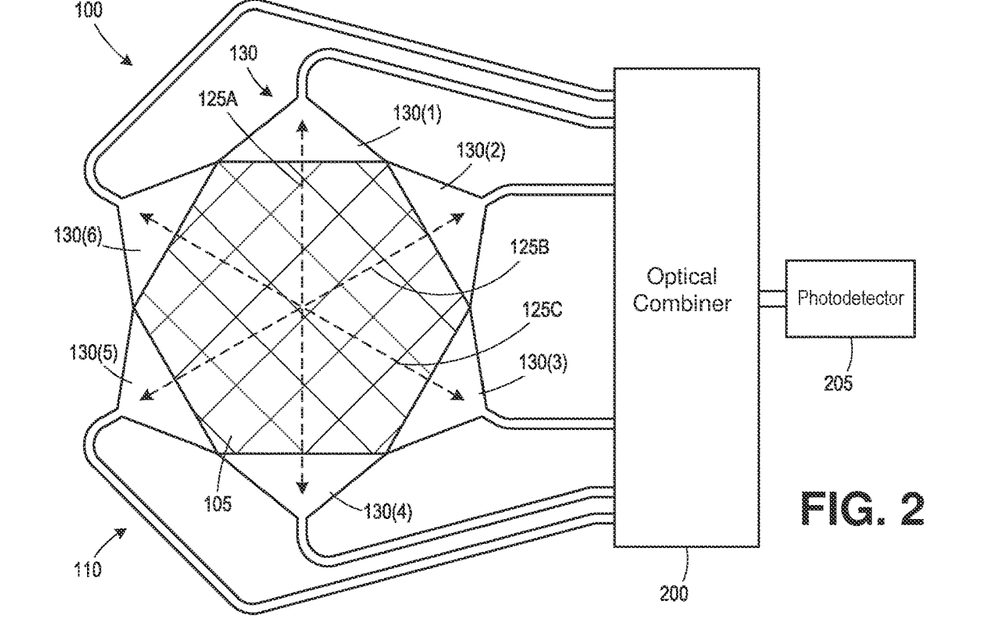
FIG. 2 illustrates a top view of an optoelectronic device comprising an optical combiner associated with the collection structure in accordance with some embodiments.

Referring to FIG. 2, a top view of the optoelectronic device 100 comprising an optical combiner 200 associated with the collection structure 110 in accordance with some embodiments is illustrated. In some embodiments, the collection structure 110 comprises input ports 130 (which are referred to individually as 130(1) . . . 130(n)) positioned around a periphery of the scattering structure 105. The input ports 130 comprise wave guides that extend to the optical combiner 200. According to some embodiments, the optical path lengths of the wave guides to the optical combiner 200 are substantially equal such that the signals propagated therein are phase aligned. In some embodiments, the input ports 130 and associated wave guides comprise silicon structures embedded in a dielectric material. In some embodiments, the optical combiner 200 is a multi-mode interferometer, such as a 6:1 multi-mode interferometer. An optical output of the optical combiner 200 is coupled to a photodetector 205. The photodetector 205 outputs a signal having a property that is indicative of the intensity of the electromagnetic radiation output by the optical combiner 200. For example, in some embodiments, the photodetector 205 outputs a current that is proportional to or otherwise indicative of the intensity of the electromagnetic radiation output by the optical combiner 200. As another example, in some embodiments, a voltage generated at an output of the photodetector 205 is proportional to or otherwise indicative of the intensity of the electromagnetic radiation output by the optical combiner 200. Thus, the output of the photodetector 205 is an electrical measure of the signal provided by the medium 115. Transitions in the output of the photodetector 205 correspond to edges in the electromagnetic signal.

In some embodiments, the input ports 130(1), 130(4) are aligned with opposite ends of the scattering axis 125A, the input ports 130(2), 130(5) are aligned with opposite ends of the scattering axis 125B, and input ports 130(3), 130(6) are aligned with opposite ends of the scattering axis 125C. According to some embodiments, the number and orientation of the scattering axes 125A-125C generated by the scattering structure 105 corresponds to the number and position of the input ports 130. In some embodiments, the layout of the input ports 130 defines a periphery of the scattering structure 105. For example, the scattering structure 105 in FIG. 2 has a hexagonal periphery corresponding to the layout of the input ports 130. In some embodiments, the scattering structure 105 defines an N-sided polygon, where N equals the number of input ports 130 in the collection structure. In some embodiments, although the polygons have linear edges, the overall shape approximates a circle with respect to a center point of the scattering structure 105.

Figure 3:
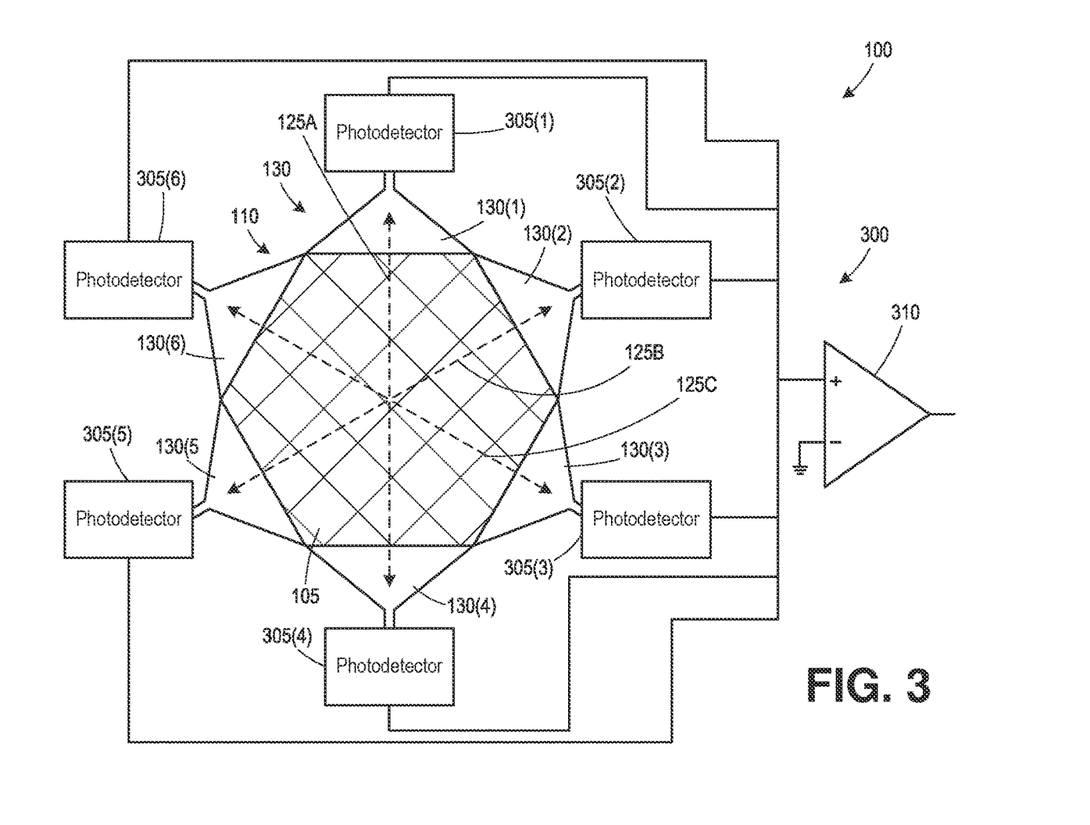
FIG. 3 illustrates a top view of an optoelectronic device comprising an electrical combining circuit associated with the collection structure in accordance with some embodiments.

Referring to FIG. 3 a top view of the optoelectronic device 100 comprising an electrical combining circuit 300 associated with the collection structure 110 is illustrated in accordance with some embodiments. In some embodiments, the periphery of the scattering structure 105 and the layout of the input ports 130(1)-130(6) corresponds to that described above in reference to FIG. 2. In some embodiments, each input port 130(1)-130(6) is coupled to a respective photodetector 305(1)-305(6). In some embodiments, the photodetectors 305(1)-305(6) are germanium based PiN diodes and the dimensions of each photodetectors are about 20 um in length and about 0.5 um in width.

In some embodiments, the photodetectors 305(1)-305(6) are coupled to an amplifier 310 in the electrical combining circuit 300 that generates a voltage proportional to a magnitude of a current received at an input of the electrical combining circuit 300. Each of the photodetectors 305(1)-305(6) generates an output signal indicative of or proportional to the electromagnetic radiation passing through the associated input port 130(1)-130(6). The electrical combining circuit 300 combines the individual signals from the photodetectors 305(1)-305(6) to generate an output signal providing an electrical measure of the signal provided by the medium 115. Transitions in the output of the electrical combining circuit 300 correspond to edges in the electromagnetic signal.

Figure 4:
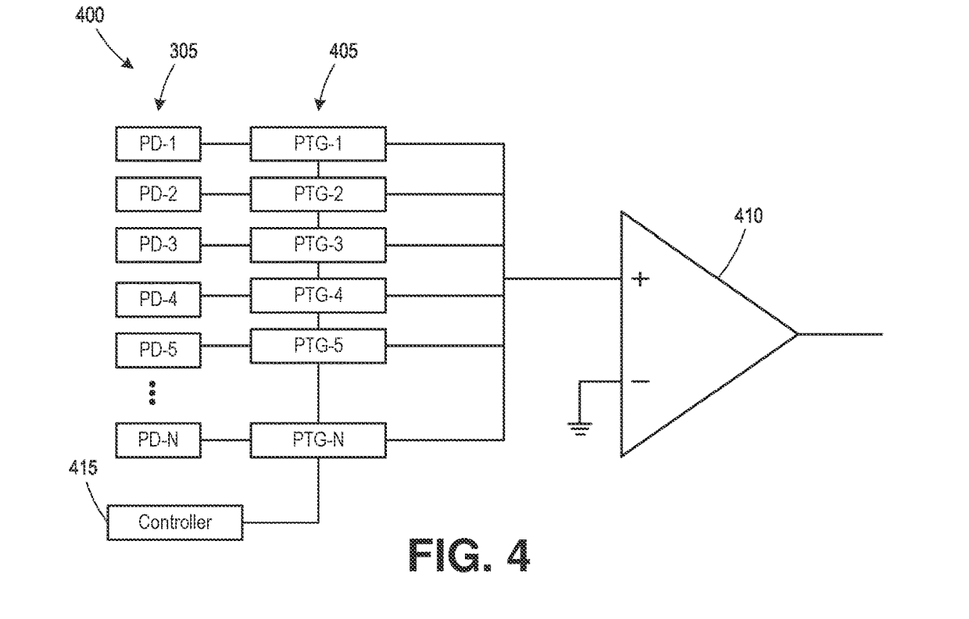
FIG. 4 illustrates a circuit diagram of an electrical combining circuit comprising phase tuning elements in accordance with some embodiments.

Referring to FIG. 4, a circuit diagram of an electrical combining circuit 400 comprising phase tuning elements 405 is illustrated in accordance with some embodiments. In some embodiments, the phase tuning elements 405 are coupled between the photodetectors 305 (e.g., the photodetectors 305(1)-306(6) in FIG. 3) and an amplifier 410. The phase tuning elements 405 allow phase alignment of the individual signals from the photodetectors 305. According to some embodiments, the phase tuning elements 405 are configured by measuring phase differences between the individual photodetectors 305 and adjusting a variable delay generated by the phase tuning elements 405. In some embodiments, a rising or falling edge in the output signal of each photodetector 305 is detected. The delay generated by each phase tuning element 405 is adjusted until the falling or rising edges are phase aligned across the photodetectors 305. In some embodiments, a controller 415 dynamically tunes the phase tuning elements 405 during operation of the optoelectronic device 100. In some embodiments, the phase tuning elements 405 are statically configured based on characterization tests performed on the optoelectronic device 100 during a design phase.

Figure 5A:
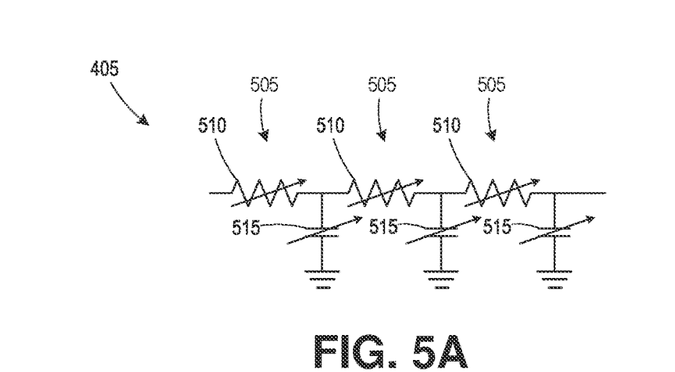
FIG. 5A illustrates a circuit diagram of a phase tuning element in accordance with some embodiments.

Referring to FIG. 5A, a circuit diagram of a phase tuning element 405 is illustrated in accordance with some embodiments. In some embodiments, the phase tuning element 405 comprises delay stages 505 that introduce a delay in the signal propagating through the phase tuning element 405. In some embodiments, each delay stage 505 comprises a resistor 510 and a capacitor 515. In some embodiments, the total delay of the phase tuning element 405 is configured by varying the number of delay stages 500. In some embodiments, one or more of the resistors 510 are variable resistors, where the resistance is varied based on a bias voltage applied to the resistor 510, such as applied by the controller 415. In some embodiments, one or more of the capacitors 515 are variable capacitors, where the capacitance is varied based on a bias voltage applied to the capacitor 515, such as applied by the controller 415.

Figure 5B:
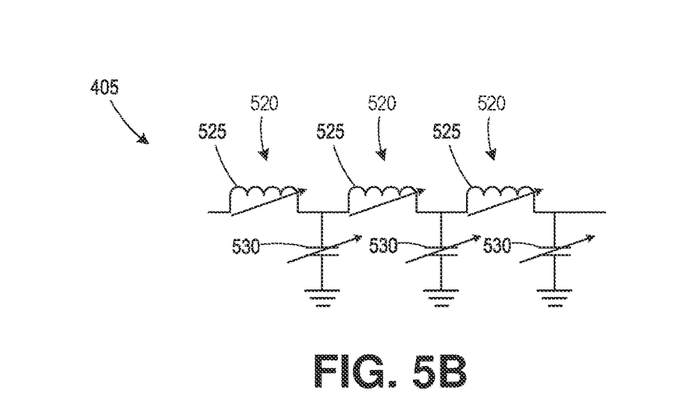
FIG. 5B illustrates a circuit diagram of a phase tuning element in accordance with some embodiments.

Referring to FIG. 5B, a circuit diagram of a phase tuning element 405 is illustrated in accordance with some embodiments. In some embodiments, the phase tuning element 405 comprises delay stages 520 that introduce a delay in the signal propagating through the phase tuning element 405. In some embodiments, each delay stage 520 comprises an inductor 525 and a capacitor 530. In some embodiments, the total delay of the phase tuning element 405 is configured by varying the number of delay stages 520. In some embodiments, one or more of the inductors 525 are variable inductors, where the inductance is varied based on a bias voltage applied to the inductor 525, such as applied by the controller 415. In some embodiments, one or more of the capacitors 530 are variable capacitors, where the capacitance is varied based on a bias voltage applied to the capacitor 530, such as applied by the controller 415.

Figure 6:
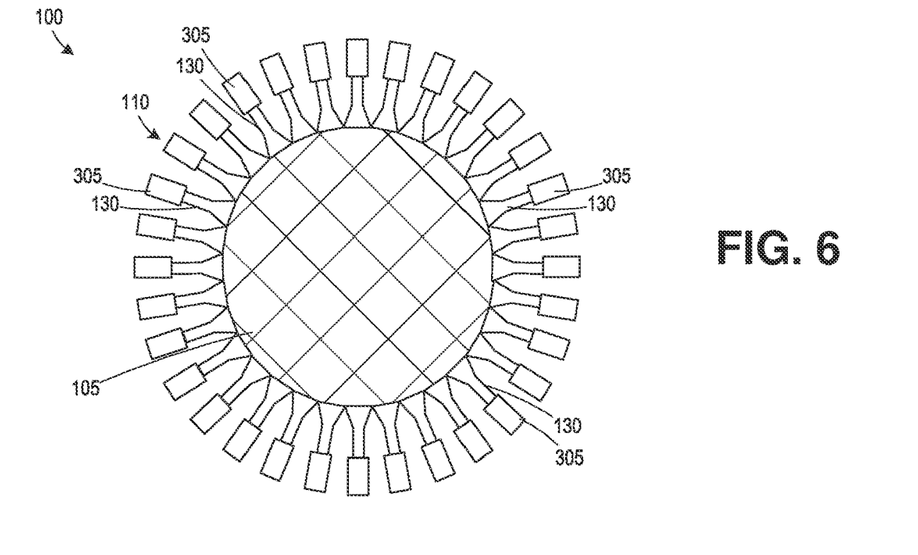
FIG. 6 illustrates a top view of an optoelectronic device comprising multiple input ports and associated photodetectors in accordance with some embodiments.

Referring to FIG. 6, a top view of the optoelectronic device 100 comprising a large number of input ports 130, each having an associated photodetector 305, according to some embodiments is illustrated. In some embodiments, the electrical combining circuit 300 illustrated in FIG. 3 is coupled to the photodetectors 305 illustrated in FIG. 6. In some embodiments, the electrical combining circuit 400 illustrated in FIG. 4 is coupled to the photodetectors 305 illustrated in FIG. 6. As seen in FIG. 6, as the number of photodetectors 305 increases, the periphery of the scattering structure 105 approaches a circular shape. According to some embodiments, the number of input ports 130 and associated photodetectors 305 vary depending on the available circuit area around the scattering structure 105. In some embodiments, with the scattering structure 105 having a perimeter of about 62 um and the photodetectors 305 having a width of about 0.5 um and a pitch of about 2 um, the number of photodetectors 305 is 31.

Referring to FIGS. 7-15 various views of scattering structures are illustrated in accordance with some embodiments. According to some embodiments, the scattering structure may be employed in the optoelectronic devices 100 described above.

Figure 7:
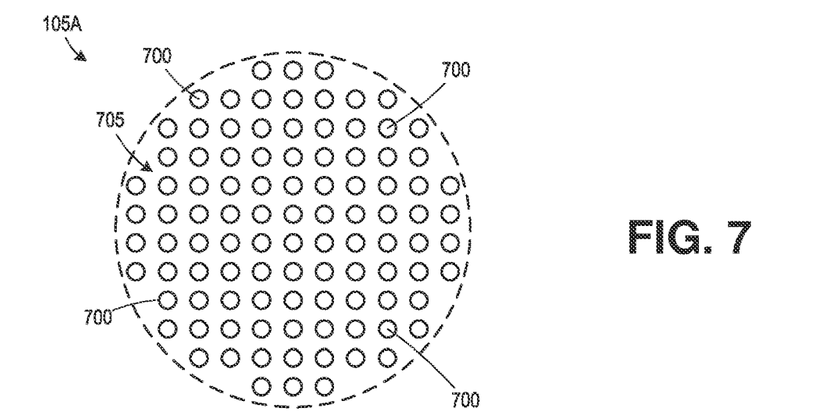
FIGS. 7-15 illustrate views of scattering structures in accordance with some embodiments.

Referring to FIG. 7, a top view of a scattering structure 105A is illustrated in accordance with some embodiments. In some embodiments, the scattering structure 105A comprises pillars 700 arranged in a grid 705. In some embodiments, the spacing of the pillars 700 in the grid 705 is periodic. In some embodiments, the spacing of the pillars 700 in the grid 705 is irregular. According to some embodiments, the pillars 700 have a circular horizontal cross-sectional shape. The circular horizontal cross-sectional shape of the pillars 700 results in a large number of non-orthogonal scattering axes (not illustrated). In some embodiments, the scattering structure 105A is employed with the optoelectronic device 100 of FIG. 6 to facilitate the large number of radially positioned input ports 130.

Figure 8:
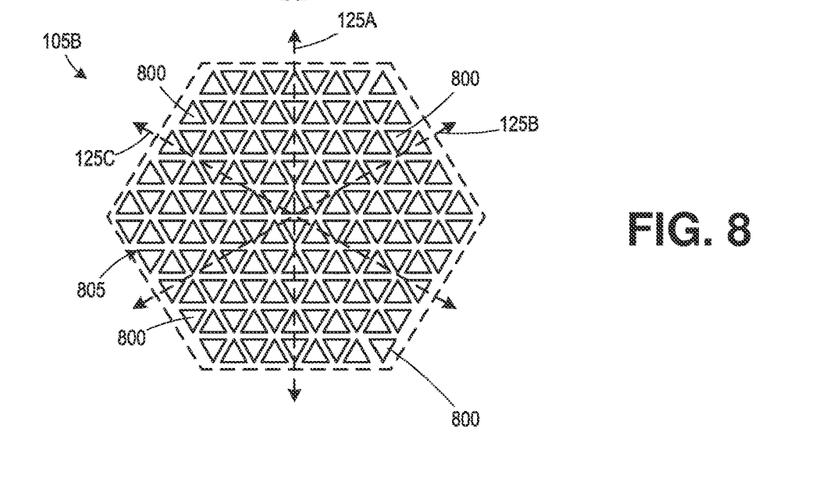

Referring to FIG. 8, a top view of a scattering structure 105B is illustrated in accordance with some embodiments. In some embodiments, the scattering structure 105B comprises pillars 800 arranged in a grid 805. In some embodiments, the spacing of the pillars 800 in the grid 805 is periodic. In some embodiments, the spacing of the pillars 800 in the grid 805 is irregular. According to some embodiments, the pillars 800 have a triangular horizontal cross-sectional shape. The triangular horizontal cross-sectional shape of the pillars 800 results in the electromagnetic radiation being scattered along the scattering axes 125A, 25B, 125C. In some embodiments, each edge of a pillar 800 is referred to as a facet, where each pillar has at least one facet oriented perpendicular to one of the scattering axes 125A, 125B, 125C. In some embodiments, each facet of a pillar 800 is oriented perpendicular to a different one of the scattering axes 125A, 125B, 125C. In some embodiments, the scattering structure 105B is employed with the optoelectronic device 100 of FIGS. 3 and 4.

Figure 9:
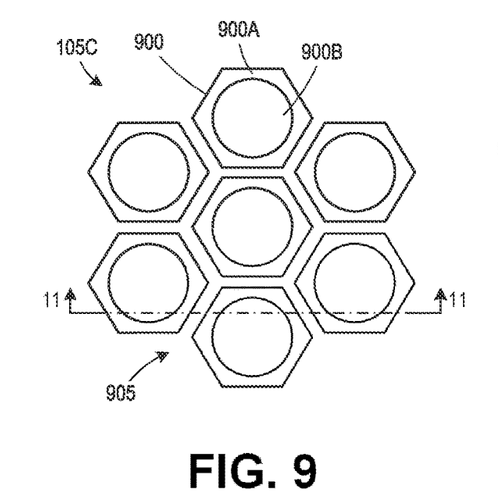
Figure 10:
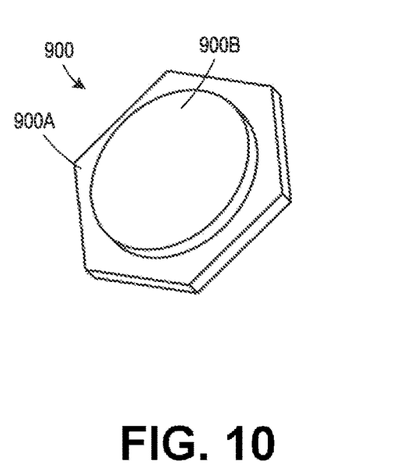
Figure 11:
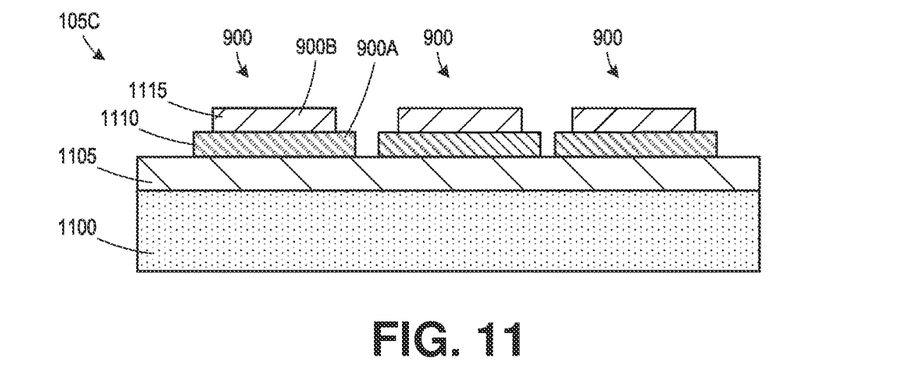

Referring to FIGS. 9-11, a top view, an isometric view, and a cross-section view of a scattering structure 105C, respectively, are illustrated in accordance with some embodiments. In some embodiments, the scattering structure 105C comprises pillars 900 arranged in a grid 905. In some embodiments, the spacing of the pillars 900 in the grid 905 is periodic. In some embodiments, the spacing of the pillars 900 in the grid 905 is irregular. According to some embodiments, the pillars 900 each have a lower member 900A and an upper member 900B positioned on the lower member 900A. According to some embodiments, the lower member 900A and the upper member 900B have different horizontal cross-sectional shapes. In some embodiments, the lower member 900A has a trapezoidal horizontal cross-sectional shape. In some embodiments, the upper member 900B has a circular horizontal cross-sectional shape. Varying the horizontal cross-sectional shapes of the lower member 900A and the upper member 900B allows the creation of various arrangements of non-orthogonal scattering axes for the scattering structure 105C, for example. In some embodiments, the circular horizontal cross-sectional shape results in substantially even scattering of the incident electromagnetic radiation toward the collection structure 110. In some embodiments, polygon shapes are employed to provide multiple scattering axes, and as the number of faces in the polygon increases, the scattering characteristics approach that of a circle.

Referring to FIG. 11, a cross-section view of the grid 905 along line 11-11 shown in FIG. 9 according to some embodiments is illustrated. In some embodiments, the scattering structure 105C is formed on a substrate having a semiconductor-on-insulator (SOI) configuration that comprises a bulk semiconductor layer 1100, a buried insulation layer 1105, a first semiconductor layer 1110 in which the lower members 900A are formed, and a second semiconductor layer 1115 in which the upper members 905B are formed. In some embodiments, the first semiconductor layer 1110 and the second semiconductor layer 1115 may comprise the same or different compositions of materials. In some embodiments, the first semiconductor layer 1110 and the second semiconductor layer 1115 are portions of the same semiconductor layer that are differentiated by an etching process. In some embodiments, the buried insulation layer 1105 is exposed between the pillars 900. According to some embodiments, patterned etching processes are performed to define the lower member 900A and the upper member 900B. In some embodiments, the bulk semiconductor layer 1100 is silicon. In some embodiments, the bulk semiconductor layer 1100 is a material other than silicon, such as silicon-germanium, a III-V compound semiconductor material, etc. In some embodiments, the buried insulation layer 1105 is silicon dioxide or other suitable dielectric. In some embodiments, the first semiconductor layer 1110 and the second semiconductor layer 1115 are silicon.

Figure 12:
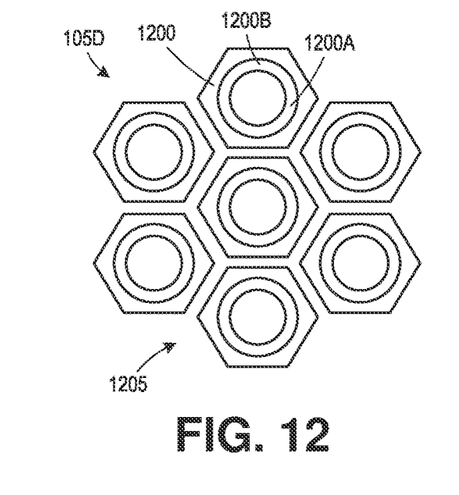
Figure 13:
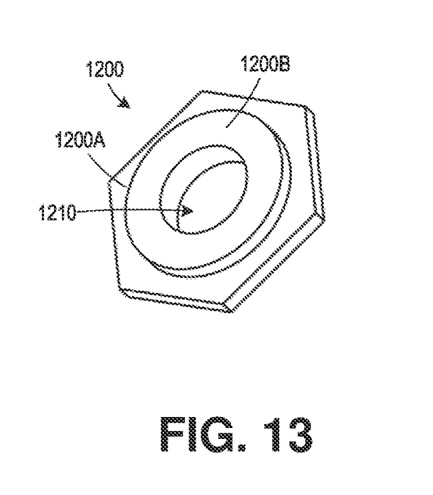

Referring to FIGS. 12-13, a top view and an isometric view of a scattering structure 105D, respectively, in accordance with some embodiments are illustrated. In some embodiments, the scattering structure 105D comprises pillars 1200 arranged in a grid 1205. In some embodiments, the spacing of the pillars 1200 in the grid 1205 is periodic. In some embodiments, the spacing of the pillars 1200 in the grid 1205 is irregular. According to some embodiments, the pillars 1200 each have a lower member 1200A and upper member 1200B positioned on the lower member 1200A. According to some embodiments, pillars 1200 are similar to the pillars 900 described in FIGS. 9-11, with the exception that an opening 1210 is defined through the upper member 1200B and the lower member 1200A to expose the underlying buried insulation layer 1105 (shown in FIG. 11).

Figure 14:
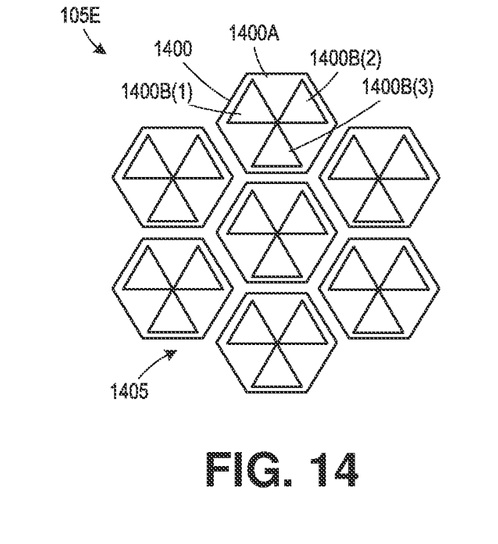
Figure 15:
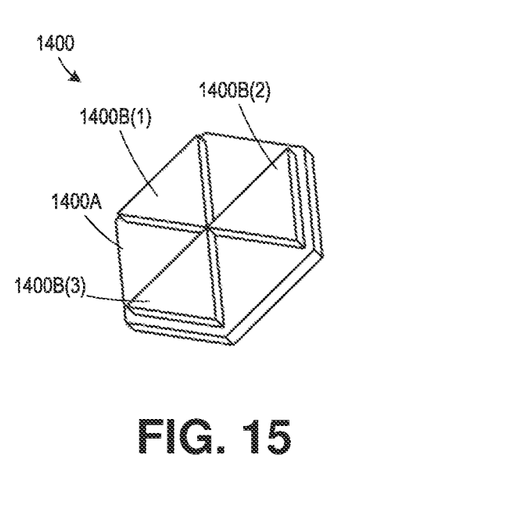

Referring to FIGS. 14-15, a top view and an isometric view of a scattering structure 105E, respectively, in accordance with some embodiments are illustrated. In some embodiments, the scattering structure 105E comprises pillars 1400 arranged in a grid 1405. In some embodiments, the spacing of the pillars 1400 in the grid 1405 is periodic. In some embodiments, the spacing of the pillars 1400 in the grid 1405 is irregular. According to some embodiments, the pillars 1400 each have a lower member 1400A and upper members 1400B(1)-1400B(3) positioned on the lower member 1400A. According to some embodiments, the lower member 1400A has a trapezoidal horizontal cross-sectional shape. In some embodiments, the upper members 1400B(1)-1400B(3) have triangular horizontal cross-sectional shapes. Varying the horizontal cross-sectional shapes of the lower members 1400A and upper members 1400B(1)-1400B(3) allows the creation of various arrangements of non-orthogonal scattering axes for the scattering structure 105E, for example.

In some embodiments, the scattering structures illustrated in FIGS. 7-15 are implemented on a semiconductor wafer. In some embodiments, the semiconductor wafer has a semiconductor-on-insulator (501) configuration that comprises a bulk semiconductor layer, a buried insulation layer, and at least one semiconductor layer in which the elements of the scattering structures are formed. FIG. 11 illustrates such an SOI substrate in reference to one embodiment of a scattering structure 105C. The same substrate configuration may be employed for the other scattering structures 105A, 105B 105D, 105E illustrated in FIGS. 7, 8, and 12-15, for example.

Figure 16:
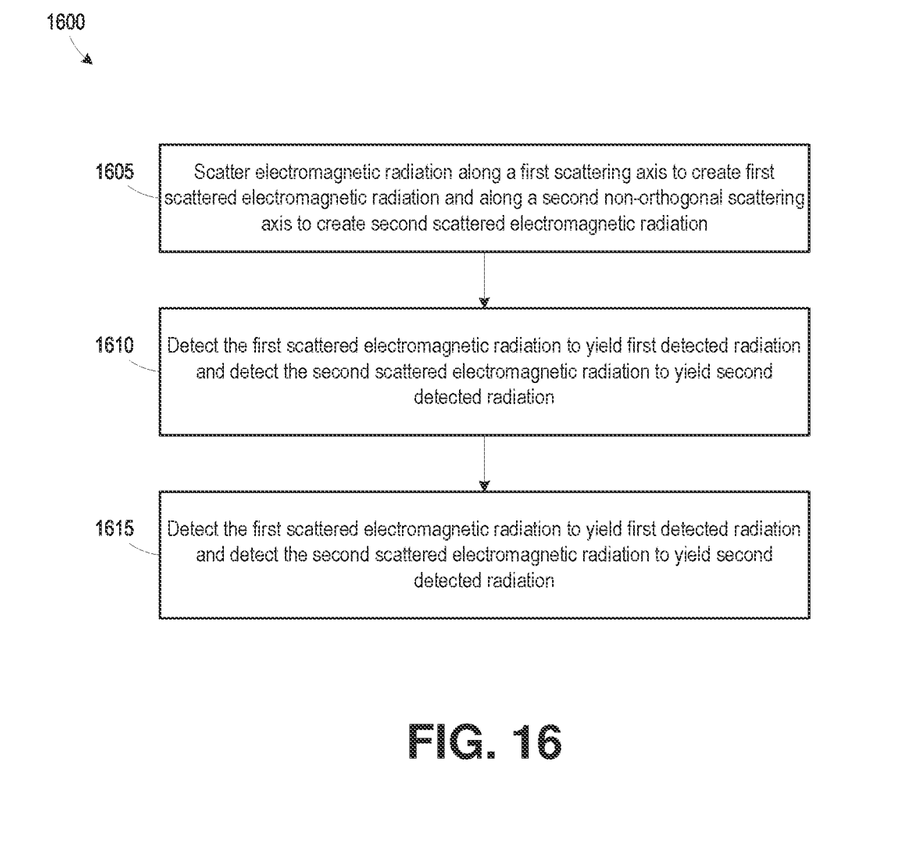
FIG. 16 illustrates a flow diagram of a method for phase aligning scattered electromagnetic radiation in accordance with some embodiments.

Referring to FIG. 16 a flow diagram of a method 1600 for phase aligning scattered electromagnetic radiation is illustrated in accordance with some embodiments. At 1605, electromagnetic radiation is scattered along a first scattering axis to create first scattered electromagnetic radiation and along a second scattering axis to create second scattered electromagnetic radiation. In some embodiments, the first scattering axis and the second scattering axis are non-orthogonal. At 1610, the first scattered electromagnetic radiation is detected to yield first detected radiation, and the second scattered electromagnetic radiation is detected to yield second detected radiation. At 1615, the first detected radiation is phase aligned with the second detected radiation.

In some embodiments, an optoelectronic device comprises a scattering structure to scatter the incident electromagnetic radiation and a collection structure comprising input ports positioned proximate the scattering structure to collect the scattered electromagnetic radiation. The collected scattered electromagnetic radiation is provided to one or more photodetectors to perform an optical-to-electrical conversion. In some embodiments, the incident electromagnetic radiation exiting the medium is vertically polarized. However, the particular orientation of the orthogonal components of the vertically polarized electromagnetic radiation impinging on the collection structure is indeterminate. The relative positioning of the input ports in the collection structure enhances polarization independence of the optoelectronic device.

In some embodiments, a device includes a scattering structure and a collection structure. The scattering structure is arranged to concurrently scatter incident electromagnetic radiation along a first scattering axis and along a second scattering axis. The first scattering axis and the second scattering axis are non-orthogonal. The collection structure is arranged to collect the scattered electromagnetic radiation and includes a first input port aligned with the first scattering axis and a second input port aligned with the second scattering axis.

In some embodiments, a device includes a scattering structure and a collection structure. The scattering structure is arranged to scatter incident electromagnetic radiation. The collection structure is arranged around a periphery of the scattering structure to collect the scattered electromagnetic radiation. The collection structure includes a first input port positioned at a first radial position around the periphery of the scattering structure and a second input port positioned at a second radial position around the periphery of the scattering structure. The first radial position and the second radial positon define an oblique angle with respect to a center point of the scattering structure.

In some embodiments, a method includes scattering electromagnetic radiation along a first scattering axis to create first scattered electromagnetic radiation and along a second scattering axis to create second scattered electromagnetic radiation. The first scattering axis and the second scattering axis are non-orthogonal. The first scattered electromagnetic radiation is detected to yield first detected radiation and the second scattered electromagnetic radiation is detected to yield second detected radiation. The first detected radiation is phase aligned with the second detected radiation.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A device, comprising:
   a scattering structure comprising a plurality of pillars positioned over a top surface of a substrate, wherein:
   the plurality of pillars are arranged to concurrently scatter incident electromagnetic radiation along a first scattering axis and along a second scattering axis,
   the first scattering axis and the second scattering axis are non-orthogonal;
   a collection structure to collect the scattered electromagnetic radiation, wherein the collection structure comprises:
   a first input port aligned with the first scattering axis;
   a second input port aligned with the second scattering axis;
   a first waveguide to guide the scattered electromagnetic radiation received at the first input port; and
   a second waveguide to guide the scattered electromagnetic radiation received at the second input port;
   a first photodetector coupled to the first input port through the first waveguide;
   a second photodetector coupled to the second input port through the second waveguide; and
   an amplifier coupled to the first photodetector and the second photodetector to generate an output signal.

2. The device of claim 1, comprising:
   a first phase tuning circuit coupled between the first photodetector and the amplifier; and
   a second phase tuning circuit coupled between the second photodetector and the amplifier.

3. The device of claim 2, comprising:
   a controller to configure the first phase tuning circuit and the second phase tuning circuit to phase align the first photodetector and the second photodetector.

4. The device of claim 1, wherein:
   a first pillar of the plurality of pillars comprises:
   a first member; and
   a second member positioned over the first member,
   the first member has a first material composition, and
   the second member has a second material composition different than the first material composition.

5. The device of claim 1, comprising:
a buried insulation layer, wherein:
   a first pillar of the plurality of pillars comprises:
      a first member positioned over the buried insulation layer; and
      a second member positioned over the first member,
   an opening is defined by the first member and the second member, and
   the buried insulation layer is exposed through the opening.

6. The device of claim 1, wherein:
a first pillar of the plurality of pillars has a first facet positioned perpendicular to the first scattering axis; and
a second pillar of the plurality of pillars has a first facet positioned perpendicular to the second scattering axis.

7. The device of claim 1, wherein:
a first pillar of the plurality of pillars comprises:
   a first member; and
   a second member positioned over the first member, and
in a projection orthogonal to the top surface of the substrate:
   the first member has a first shape, and
   the second member has a second shape different than the first shape.

8. The device of claim 1, wherein:
a first pillar of the plurality of pillars comprises:
   a first member; and
   a second member positioned over the first member, and
an opening is defined in a top surface of the second member.

9. The device of claim 1, wherein the first photodetector is a germanium based PiN diode.

10. A device, comprising:
a scattering structure comprising a plurality of pillars positioned over a top surface of a substrate, wherein:
   the plurality of pillars are arranged to concurrently scatter incident electromagnetic radiation along a first scattering axis and along a second scattering axis,
   the first scattering axis and the second scattering axis are non-orthogonal,
   a first pillar of the plurality of pillars comprises:
      a first member; and
      a second member positioned over the first member,
   the first member has a first material composition, and
   the second member has a second material composition different than the first material composition; and
a collection structure to collect the scattered electromagnetic radiation, wherein the collection structure comprises:
   a first input port aligned with the first scattering axis;
   a second input port aligned with the second scattering axis;
   a first waveguide to guide the scattered electromagnetic radiation received at the first input port; and
   a second waveguide to guide the scattered electromagnetic radiation received at the second input port.

11. The device of claim 10, comprising:
a buried insulation layer, wherein:
   an opening is defined by the first member and the second member, and
   the buried insulation layer is exposed through the opening.

12. The device of claim 10, wherein at least one of:
the first pillar has a first facet positioned perpendicular to the first scattering axis; or
a second pillar of the plurality of pillars has a first facet positioned perpendicular to the second scattering axis.

13. The device of claim 10, wherein:
a second pillar of the plurality of pillars comprises:
   a third member; and
   a fourth member positioned over the third member, and
in a projection orthogonal to the top surface of the substrate:
   the third member has a first shape, and
   the fourth member has a second shape different than the first shape.

14. The device of claim 10, wherein:
a second pillar of the plurality of pillars comprises:
   a third member; and
   a fourth member positioned over the third member, and
an opening is defined in a top surface of the fourth member.

15. A device, comprising:
a scattering structure comprising a plurality of pillars positioned over a top surface of a substrate, wherein:
   the plurality of pillars are arranged to concurrently scatter incident electromagnetic radiation along a first scattering axis and along a second scattering axis,
   the first scattering axis and the second scattering axis are non-orthogonal;
a collection structure to collect the scattered electromagnetic radiation, wherein the collection structure comprises:
   a first input port aligned with the first scattering axis;
   a second input port aligned with the second scattering axis;
   a first waveguide to guide the scattered electromagnetic radiation received at the first input port; and
   a second waveguide to guide the scattered electromagnetic radiation received at the second input port; and
a buried insulation layer, wherein:
   a first pillar of the plurality of pillars comprises:
      a first member positioned over the buried insulation layer; and
      a second member positioned over the first member,
   an opening is defined by the first member and the second member, and
   the buried insulation layer is exposed through the opening.

16. The device of claim 15, comprising:
a first photodetector coupled to the first input port through the first waveguide; and
a first phase tuning circuit coupled to the first photodetector.

17. The device of claim 16, comprising:
an amplifier coupled to the first phase tuning circuit.

18. The device of claim 16, wherein at least one of:
the first pillar has a first facet positioned perpendicular to the first scattering axis; or
a second pillar of the plurality of pillars has a first facet positioned perpendicular to the second scattering axis.

19. The device of claim 16, wherein:
a second pillar of the plurality of pillars comprises:
   a third member; and
   a fourth member positioned over the third member, and
in a projection orthogonal to the top surface of the substrate:
   the third member has a first shape, and
   the fourth member has a second shape different than the first shape.

20. The device of claim 16, wherein:
a second pillar of the plurality of pillars comprises:
   a third member; and
   a fourth member positioned over the third member, and
an opening is defined in a top surface of the fourth member.

* * * * *